United States Patent [19]

Lindgren

[11] 4,108,753

[45] Aug. 22, 1978

[54] APPARATUS FOR RECOVERY OF RE-USABLE SUBSTANCES FROM A FIXING BATH IN PROCESSES FOR DEVELOPMENT AND FIXING OF PHOTOGRAPHIC FILMS AND X-RAY FILMS

[75] Inventor: Östen Lindgren, Solna, Sweden

[73] Assignee: AB Metall & Bergprodukter, Solna, Sweden

[21] Appl. No.: 794,475

[22] Filed: May 6, 1977

Related U.S. Application Data

[62] Division of Ser. No. 632,274, Nov. 17, 1975, Pat. No. 4,042,473.

[30] Foreign Application Priority Data

Dec. 4, 1974 [SE] Sweden ............................. 7415216

[51] Int. Cl.² ............................................ C25B 13/02
[52] U.S. Cl. .............................................. 204/263
[58] Field of Search ................ 204/275, 109, 263, 151

[56] References Cited

U.S. PATENT DOCUMENTS 3,274,094  9/1966  Klein ................................. 204/275

*Primary Examiner*—R. L. Andrews

*Attorney, Agent, or Firm*—Anthony J. Casella

[57] ABSTRACT

Apparatus and a process for electroylic recovery of silver from fixng baths obtained by development of photographic films wherein the fixing bath solution coming from the tank for the fixing bath to the development apparatus is fed from the development apparatus into one chamber in a recovery apparatus comprising two chambers until the said first chamber is filled whereupon the silver precipitation is started in the said chamber; an automatic redirection of the liquid flow from the development apparatus to the second chamber of the recovery apparatus is made to the said second chamber which being filled with liquid during the precipitation process in the first chamber. After concluded silver precipitation in the first chamber the liquid treated therein is automatically fed to the sewage. When the second chamber has been filled the precipitation process in the same is started. Simultaneously the liquid flow from the development apparatus is automatically fed to the first chamber which now is empty. When the precipitation process in the second chamber is finished the liquid is pumped through a filter — i.e. for removal of gelatine, silver bromide, etc. — from the second chamber back to the chemicals tank for re-use, whereupon the cycle is repeated.

5 Claims, 4 Drawing Figures

APPARATUS FOR RECOVERY OF RE-USABLE SUBSTANCES FROM A FIXING BATH IN PROCESSES FOR DEVELOPMENT AND FIXING OF PHOTOGRAPHIC FILMS AND X-RAY FILMS

This is a division of application Ser. No. 632,274 filed Nov. 17, 1975, (U.S. Pat. No. 4,042,473).

The present invention relates to a process and an apparatus for recovery of re-usable substances, viz. silver and chemicals, from a fixing bath after the use of the same in processes for development and fixing of photographic films and X-ray films.

After the development of photographic films and X-ray films in development apparatus the films are commonly fixed in the same apparatus with a fixing solution, whereupon the said solution, which then contains silver from the film emulsion layers is introduced into an apparatus for recovery of the silver. When the major part of the silver has been recovered from the solution in the metallic form the solution is discarded into the sewage.

This procedure has certain disadvantages. The solution discarded into the sewage still contains a certain amount of silver and also valuable fixing solution chemicals of which at least part could be re-usable. The discarded solution constitutes a polluting factor in the sewage water and, further, an economical disadvantage. Since the fixing bath during the silver recovery process for a long time is submitted to the action of a current of high density — usually about 15 A — so as to ensure the greatest possible recovery of the silver content from the solution obtained from the development apparatus, which bath contains about 6 - 7 grams silver per liter, a considerable decomposition of the chemicals occurs during the silver recovery process. Due to the presence of the said decomposed chemicals, which consist of sodium salts and the like, the silver in the solution is usually contaminated, which results in a decreased efficiency of the process. A further disadvantage of the previously known processes — e.g. the process according to the Swedish published patent application No. 372,294 — is that they require a special storage or aid tank with a pumping device for feeding the baths or solutions from the tank to the recovery apparatus.

The purpose of the present invention is to eliminate the said disadvantages and to achieve a process and an apparatus therefor to achieve the following advantages:

The silver recovery becomes higher and the recovery process is performed more rapidly since the present process from the beginning is performed with the full silver concentration, e.g. a concentration of 6 grams per liter. Since the electric current during the electrolytic process interacts on the solution and its content of chemicals during a shorter period of time than in the previously known processes, the chemicals are not decomposed as extensively as in the said known processes which means that at least part of the chemicals can be re-used. Further, in the present process and in the apparatus according to the invention the hitherto required special aid tank and the pumping device can be omitted.

According to the invention the recovery process is performed as follows:

The fixing bath solution coming from the tank for the fixing bath to the development apparatus is fed from the development apparatus into one chamber in a recovery apparatus comprising two chambers until the said first chamber is filled whereupon the silver precipitation is started in the said first chamber; an automatic redirection of the liquid flow from the development apparatus to the second chamber of the recovery apparatus is made to the said second chamber which is filled with liquid during the precipitation process in the first chamber. After precipitation of the silver is completed in the first chamber the liquid treated therein is automatically fed to the sewage. When the second chamber has been filled the precipitation process in the same is started. Simultaneously the liquid flow from the development apparatus is automatically fed to the first chamber which is now empty. When the precipitation process in the second chamber is finished the liquid is pumped through a filter — i.e. for removal of gelatine, silver bromide, etc. — from the second chamber back to the chemicals tank for re-use, whereupon the cycle is repeated.

The process and an apparatus suitable for performing the same are described with reference to the enclosed drawings. In the drawings FIG. 1 shows diagramatically a film development apparatus with a recovery apparatus.

Figure 1:
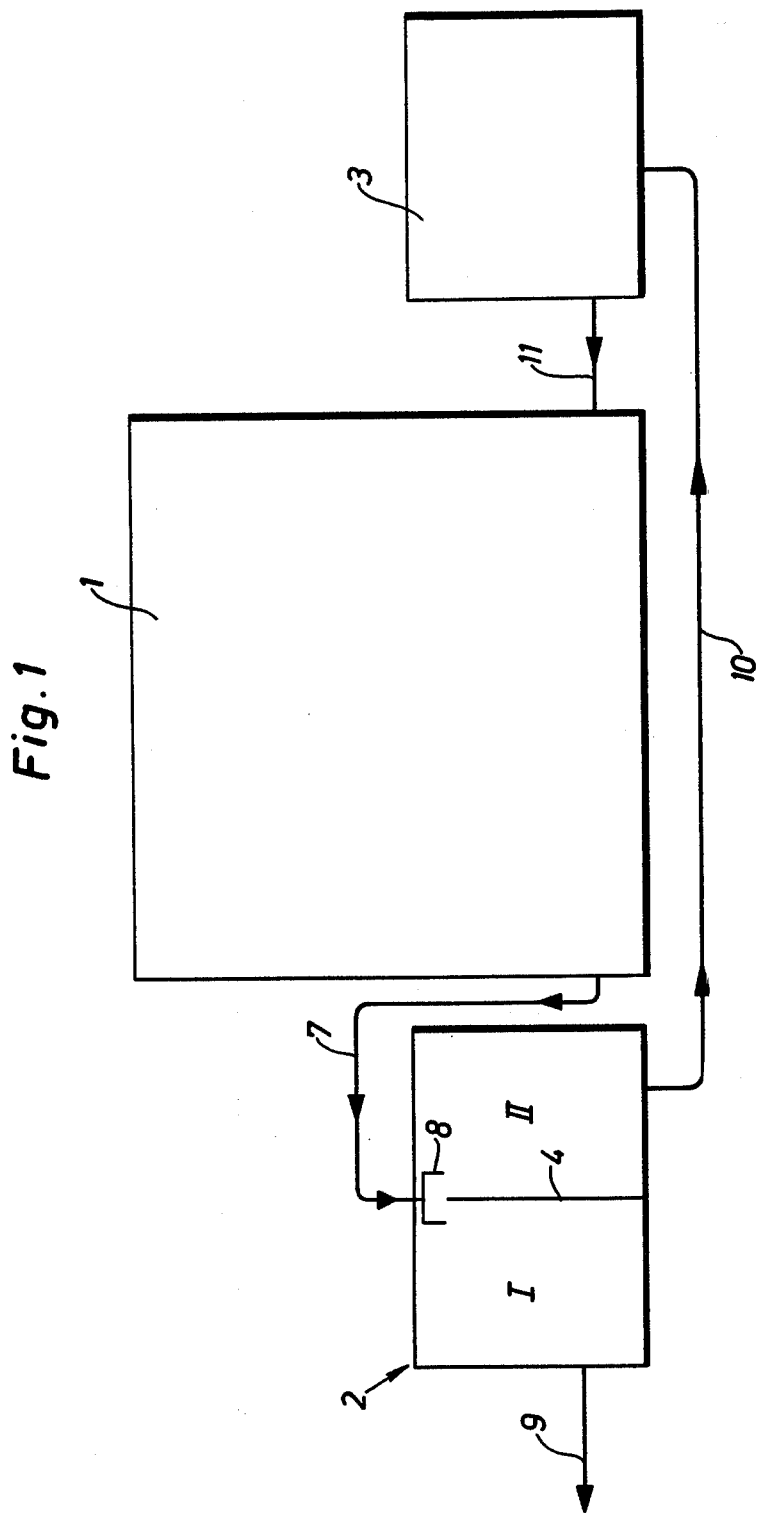
Figure 2:
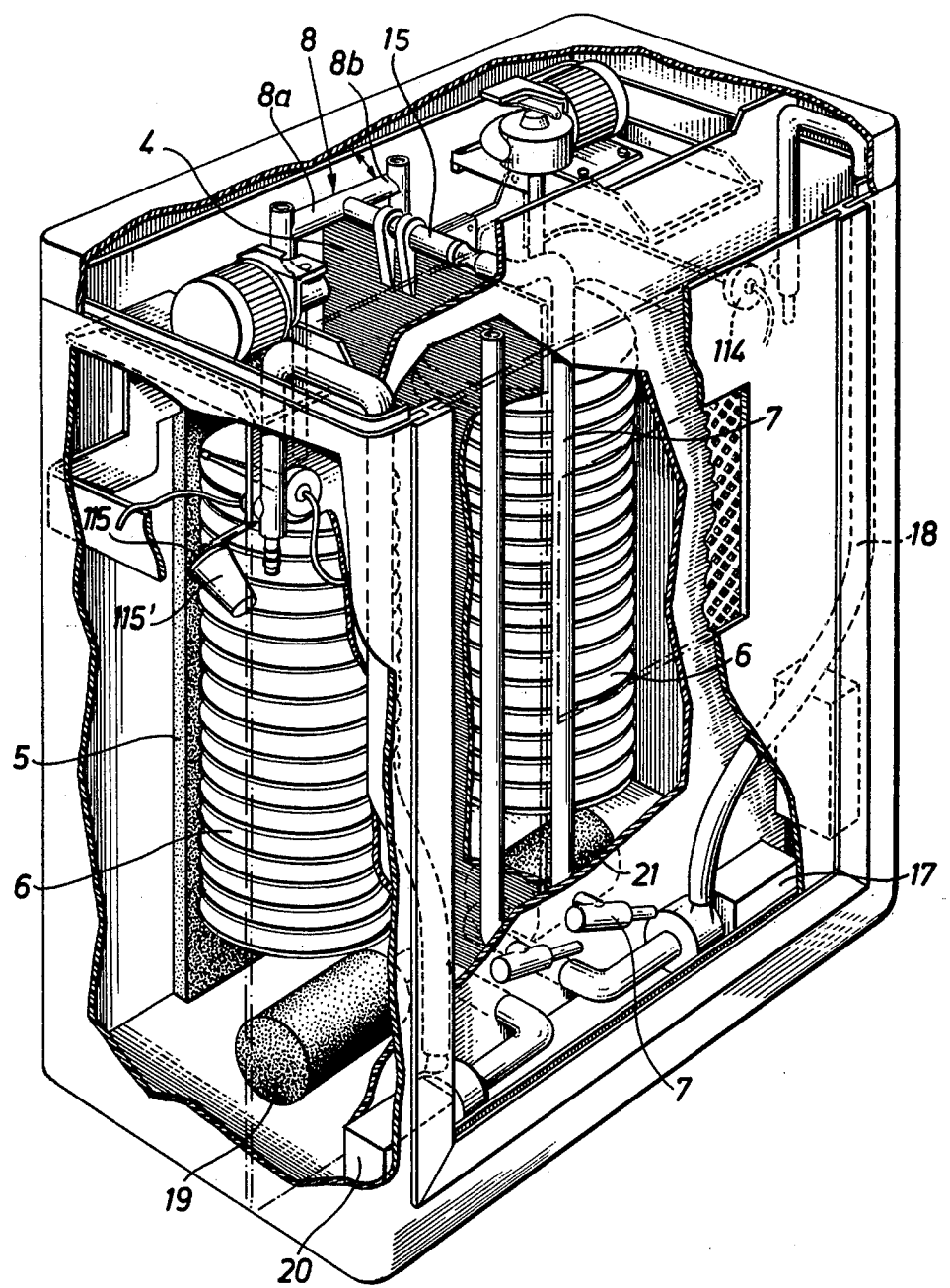
FIG. 2 shows the recovery apparatus according to the invention.

In FIG. 1 the development apparatus is indicated by 1, the recovery apparatus by 2 and the chemicals tank for the fixing bath by 3. As can be seen in FIGS. 1 and 2 the recovery apparatus is subdivided with a separating wall 4 to the formation of two chambers I and II which contain the anodes 5 (see FIG. 2) and the cathodes 6 (see FIG. 2) for the electrolytical silver recovery process. The flow guiding device which is essential for performing the automatic recovery process is indicated by 8.

The recovery process is performed in the described apparatus in the following manner:

The fixing bath coming from the chemicals tank 3 to the development apparatus 1 is fed from the development apparatus via a line 7 to the recovery apparatus 2. With the aid of the flow guiding device 8 arranged in the recovery apparatus above the separating wall 4, which flow guiding device is designed as is shown in more detail in FIG. 4 with a rocker operated by floaters for automatic redirection or guiding of a flow to one or the other of two chambers, the redirection of the liquid flow from the development apparatus to one of the chambers in the recovery apparatus is achieved.

Figure 3:
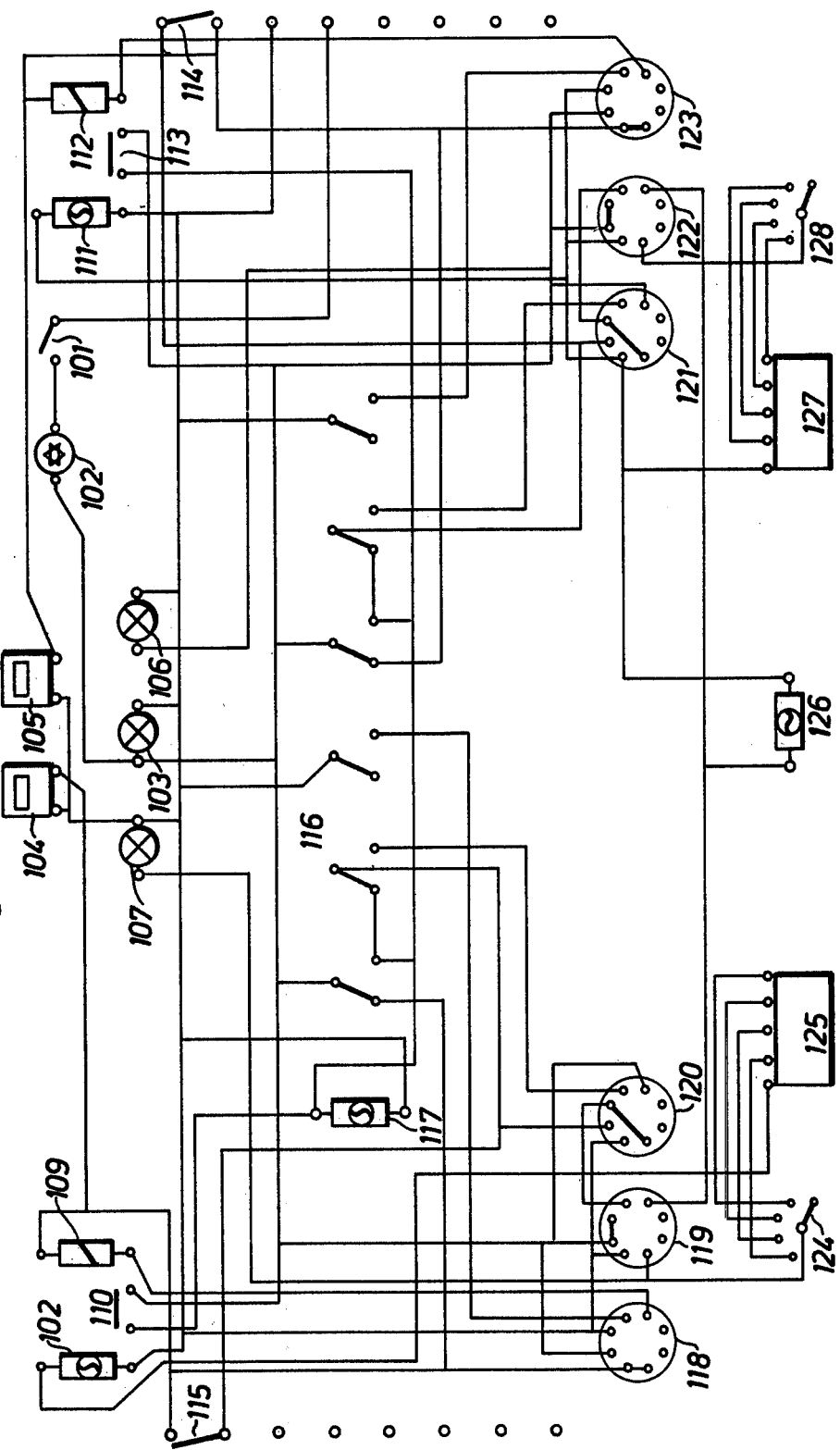
FIG. 3 is a coupling diagram for the recovery apparatus.

When performing the process in the device indicated in FIG. 1 with the recovery apparatus illustrated in FIGS. 1 and 2 the recovery apparatus is connected manually with the aid of the switch 101 shown in FIG. 3 and the liquid is fed from the development apparatus via the line 7 and the reguiding rocker 8 to chamber I in the apparatus. The liquid flows into the apparatus through line 7 which is extended upwards, through the central tube 15 of the rocker and one or the other of the forks 8a and 8b resp. of the said tube to exit connecting pieces 8c and 8d resp. directed upwards rectangularly to the fork coilings. When chamber I is filled up to the level of the microswitch 115 with the fixing bath which enters via connection piece 8c located in the upper part of chamber I, the floater 115′ of the microswitch is lifted by the liquid and said microswitch starts the programme circuit 116 of the recovery apparatus. The programme circuit in its turn starts the time relay 108 in chamber I which counts the precipitation time predetermined in the programme circuit, e.g. a period of 4 hours. When chamber I is completely filled and the silver recovery process has started floater 12 in this chamber is lifted by the raising liquid in chamber I and takes a downwardly sloping position in chamber I due to the weight of the liquid flowing through the fork tube 8a and the exit connecting piece 8c in chamber I. During this ascending movement the guiding rocker is turned to inlet line 7 via central tubes 15 connected with elastic tubes 14, which tube 15 is movably attached to the separating wall 4 with clamps 16. The turning is not prevented by solid particles which may be deposited at the hinge point. The liquid flow to the fork tube 8a then stops and the flow is directed via the fork tube 8b and the connecting piece 8d to chamber II. The rocker then retains its downwardly sloping position in chamber II due to the weight of the liquid flowing from the central tube 15 to the fork tube 8b. This chamber then acts as a holding or buffering tank for the liquid during the period of time during which the silver separation is made in chamber I.

When the period of time programmed for the silver separating process in chamber I has elapsed switch 110 in the time relay switches on and starts the same programme circuit which via relay 118 now brings about the emptying of liquid from chamber I through a filter 19 to the sewage with the aid of a pump 20 and simultaneously the pointer of the time piece is returned to the starting point for the next treatment period in the second chamber II.

The filling of chamber II with liquid during the period during which the recovery process occurs in chamber I and during which chamber II acts as a holding or buffering tank usually takes longer time than the silver recovery process in chamber I requires. When the level in chamber II has attained the level of the microswitch 114 this switch starts the programme circuit 116 which in its turn starts the motor 111 of the time relay for chamber II and this relay then counts the predetermined work period for the silver recovery process in chamber II.

When the level in chamber II has risen further and reached the floater 13 of the reguiding device in chamber II this floater is lifted so that the reguiding device, i.e. the rocker 8, is turned so that the liquid weighs down fork tube 8a and the liquid flows from the development apparatus via tube 7 and the central tube 15 instead of into chamber II, it enters chamber I which in the now following period acts as a holding or buffering tank for the liquid during the period of time for the silver recovery process in chamber II.

When the predetermined time for the silver recovery process in chamber II has lapsed the time relay 111 starts the programme circuit once more, which in its turn switches on the relay 123 governing the emptying pump 17 for transferring the liquid passed through a filter 21 from the chamber II to the chemicals tank 3 via a line 18 outside of the chamber in the apparatus, directed partly upwards and partly downwards.

Figure 4:
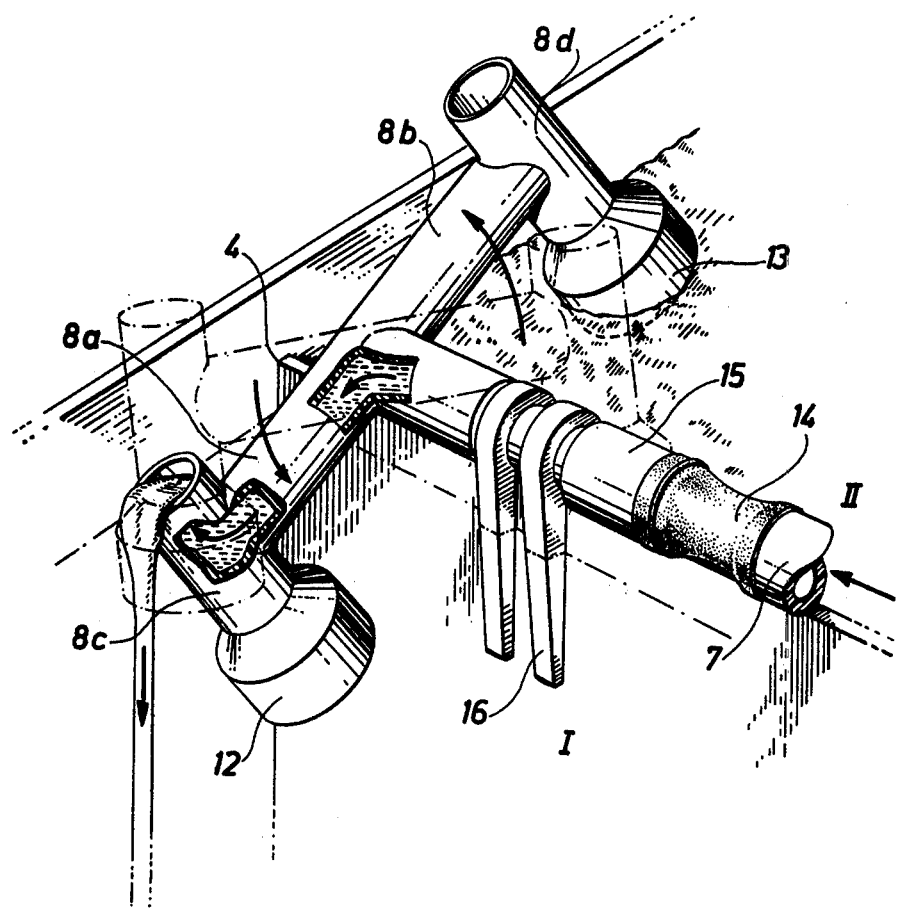
FIG. 4 shows a flow guiding device for the recovery apparatus.

The reguiding device 8 which is not only usable in connection with a recovery apparatus in a development apparatus but also in general can be used for automatic reguiding of a liquid flowing through the reguiding device from a filled tank to an empty tank is shown in detail in FIG. 4 and arranged above the separating wall 4 between the two tanks I and II. The hinged part of the reguiding device consists of the central liquid feeding tube 15 which is connected to the feed line 7.

In the diagram according to FIG. 3 102 is a fuse with a lamp which indicates melting of the fuse. 103 is a signal lamp indicating that the apparatus is working. 104 and 105 are counters for each silver recovery liquid in one or the other of the chambers. 106 and 107 are control lamps for one or the other of the silver recovery units. 108 and 111 are motors of the relays for the both chambers. 109 and 112 are coils for return of the periods of time to which the relays have been adjusted. 110 and 113 are switches in the time relays. 114 and 115 are two microswitches for the two chambers. 116 is the programme circuit for programation of the process programme and 117 is the driving motor of the circuit. 118 and 123 are relays for the emptying pumps in chambers I and II. 119 and 122 are relays for switching on the electrolysis current in the two recovery chambers. 120 and 121 resp. are relays for the automatic function of the device. 124 and 128 resp. are the step switches for the current to the two recovery chambers. 125 and 127 are transformers for the chambers and 126 is a cooling fan.

It is obvious from the description of the novel process and the apparatus intended for performing the process that the novel process enables recovery of the silver present in the fixing solution from the development apparatus and of at least part, e.g. 50%, of the usable chemicals present in the said solution, that the amount of chemicals fed to the sewage and the inherent pollution will be reduced and that the recovery degree is increased and that the whole recovery apparatus has been simplified.

Further, a more rapid conclusion of the process is achieved and the handling is facilitated since the work with the feeding and the mixing of the fixing bath in the chemicals tank is reduced since part of the fixing bath from one chamber of the recovery device automatically is fed back to the chemicals tank.

Finally, the apparatus enables an adjustment of the process time and the current strength individually for each chamber. This is of a great importance for performing the recovery process in the chamber, the chemicals in which shall be returned to the chemicals tank and which thus must not be too extensively decomposed by a great current strength for a long period of time and which still contains small amounts of silver. On the other hand, the liquid in the chamber which is connected to the sewage can be submitted to the action of a higher current strength for a longer period of time so that the degree of silver recovery can be optimized.

I claim:

1. Recovery apparatus for the electrolytic recovery of silver from fixing bath solutions obtained by development of photographic films and X-ray films comprising: a tank connected to the development fixing bath, said tank containing the anodes and cathodes for the electrolytic process, and being subdivided into first and second chambers by a separating wall; and a flow guiding device disposed above said separating wall and by means of a rocker and floaters operative to automatically guide the solution flowing from the development fixing baths to the first chamber until this chamber is filled, whereupon silver precipitation is started in this chamber, and to the second chamber which is filled with liquid during the precipitation process in the first chamber, respectively, of which chamber one is connected to sewage and chamber two is connected to a recovery chemicals tank.

2. Recovery apparatus as in claim 1 including an electronic programme circuit means for controlling the operation of the recovery apparatus, said programme circuit means including relays for automatically controlling pumps interconnecting the tank to the sewage and to the recovery chemicals tank.

3. Recovery apparatus as in claim 1 wherein the flow guiding device is provided with first and second floaters for respectively sensing the levels of the solutions in the first and second chambers for guiding the solution flow of the fixing bath from the development apparatus to the one empty chamber for filling it and after sensing this state and after the start of the silver precipitation in this filled chamber guiding the solution flow to the other chamber for filling this empty chamber during the precipitation process in the first named chamber.

4. Recovery apparatus according to claim 1 wherein said flow guiding device includes a hinged flow tube located centrally above the separating wall between the two chambers of the tank, and forked tubes directed towards each one of the chambers, each one of said forked tubes having the shape of a T being provided with a floater attached to the end of the one branch reaching down into the chamber located below and interacting with this forked tube to tilt it and to cause flow first to the one chamber and then to the other, and provided with an upwardly directed and upwards open tube connection coaxially with the floater.

5. Recovery apparatus according to claim 4 wherein the central hinged flow tube is connected to the connection from the development fixing bath by means of an elastic tube.

* * * * *